(12) United States Patent
Takeuchi et al.

(10) Patent No.: US 9,223,318 B2
(45) Date of Patent: Dec. 29, 2015

(54) MASS FLOW CONTROLLER SYSTEM

(75) Inventors: Hiroyuki Takeuchi, Kyoto (JP); Yutaka Yoneda, Kyoto (JP); Yasuhiro Isobe, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 458 days.

(21) Appl. No.: 13/519,115

(22) PCT Filed: Dec. 22, 2010

(86) PCT No.: PCT/JP2010/073172
§ 371 (c)(1),
(2), (4) Date: Jun. 25, 2012

(87) PCT Pub. No.: WO2011/078242
PCT Pub. Date: Jun. 30, 2011

(65) Prior Publication Data
US 2012/0298221 A1    Nov. 29, 2012

(30) Foreign Application Priority Data

Dec. 25, 2009 (JP) ................................ 2009-295400

(51) Int. Cl.
G05D 7/06 (2006.01)

(52) U.S. Cl.
CPC ......... G05D 7/0652 (2013.01); *Y10T 137/7784* (2015.04)

(58) Field of Classification Search
CPC .................................................. G05D 7/0652
USPC ..................................... 137/487.5; 702/282
See application file for complete search history.

(56) References Cited

U.S. PATENT DOCUMENTS

| | | | | |
|---|---|---|---|---|
| 5,062,446 A | * | 11/1991 | Anderson | G05D 7/0635 137/487.5 |
| 8,356,623 B2 | * | 1/2013 | Isobe | G05D 7/0635 137/487.5 |
| 8,851,105 B2 | * | 10/2014 | Kashima | G05D 7/0635 137/487.5 |
| 2009/0312876 A1 | | 12/2009 | Yoneda et al. | |

FOREIGN PATENT DOCUMENTS

| | | |
|---|---|---|
| CN | 101583916 A | 11/2009 |
| JP | 06041759 | 2/1994 |

(Continued)

OTHER PUBLICATIONS

ISA Japan, International Search Report of PCT/JP2010/073172, Jan. 25, 2011, WIPO, 1 page.

(Continued)

*Primary Examiner* — Eric Keasel
(74) *Attorney, Agent, or Firm* — Alleman Hall McCoy Russell & Tuttle LLP

(57) ABSTRACT

A mass flow controller with high accuracy flow rate output control is disclosed. In the mass flow controller, relation data that indicates a corresponding relation between a flow rate of a reference gas and a CF value of a sample gas is stored, a target flow rate is converted into a reference gas flow rate by the use of a predetermined CF value, a sample gas flow rate is calculated from the converted reference gas flow rate and a CF value corresponding to the reference gas flow rate, the sample gas flow rate is compared with the target flow rate, and the CF value that is used for conversion of the reference gas flow rate or calculation of the sample gas flow rate is updated by the use of the corresponding relation based on the error between the sample gas flow rate and the target flow rate.

4 Claims, 6 Drawing Sheets

(56) References Cited

FOREIGN PATENT DOCUMENTS

| | | |
|---|---|---|
| JP | 11083732 | 3/1999 |
| JP | 11265218 | 9/1999 |
| JP | 2001264138 | 9/2001 |
| JP | 4752086 B2 | 8/2011 |

OTHER PUBLICATIONS

State Intellectual Property Office of China, Office Action of Chinese Patent Application No. 201080047852.6 with English summary as translation, Dec. 26, 2013, 10 pages.

* cited by examiner

MASS FLOW CONTROLLER SYSTEM

FIELD OF THE ART

This invention relates to a mass flow controller system that controls a flow rate of a gas in a semiconductor manufacturing device or an engine exhaust gas measurement device.

BACKGROUND ART

Recently, it has been conceived that measurements conventionally conducted by multiple ranges are conducted in a single range by combining a gas mixer as shown by Patent document 1 with a gas analyzer such as an engine exhaust gas measurement system. This has merit because not only does an operation such as automatically switching the range correlation or a measurement range become unnecessary, but also the number of the calibration gases to be used can be reduced considerably.

The gas mixer is used for taking out a gas having a predetermined concentration by mixing a sample gas whose concentration is known with a dilution gas such as, for example, a nitrogen ($N_2$) gas or air at a predetermined ratio, and is comprised of a sample gas line where a mass flow controller is arranged and a dilution gas line where a mass flow controller is arranged.

Then these mass flow controllers (MFCs) are incorporated into a gas mixer after being calibrated by the use of a reference gas such as a nitrogen ($N_2$) gas. The mass flow controller (MFC) is used to particularly control the flow rate of the sample gas (a component gas), and converts the target flow rate of the sample gas into the flow rate of the reference gas by the use of a conversion factor (a CF value, a gas type correction coefficient) between the reference gas and the sample gas so as to set the flow rate set value of the MFC. A conventional MFC has only one CF value for each gas type and converts the flow rate of the sample gas into the flow rate of the reference gas by the use of the single CF value for all of the flow rate set values.

However, since the CF value of the sample gas differs for each concentration or each flow rate value of the sample gas, there is a problem that an error is often generated depending on the concentration and the flow rate value, if the target flow rate of the sample gas is converted into the flow rate of the reference gas by the use of one CF value alone.

Although conceivably the mass flow controller might be used in a manner that involves a separate calibration for each gas type, it would be troublesome to conduct such a separate calibration for each of the mass flow controllers for each of numerous gas types, and thus using sample gases for calibration cannot be said to be an effective measure from a cost perspective.

PRIOR ART DOCUMENT

Patent Document

Patent document 1: Japanese Unexamined Patent Application Publication No. 11-83732

DISCLOSURE OF THE INVENTION

Problems to be Solved by the Invention

The present claimed invention intends to solve all of the above problems and a main object of this invention is to make it possible to control the flow rate output by a mass flow controller with high accuracy by selecting the optimum CF value for each flow rate value of the reference gas while focusing attention on the fact that the CF value of the sample gas varies for each flow rate value of the reference gas.

Means to Solve the Problems

More specifically, a mass flow controller system in accordance with this invention is a system that comprises a flow rate control device calibrated by the use of a reference gas and a control device that outputs a flow rate set value to the flow rate control device, and is characterized by comprising a relation data store part that stores a relation data indicating a corresponding relation between a flow rate value of the reference gas and a CF value of a sample gas, a reference gas flow rate conversion part that converts a target flow rate of the sample gas to be flowed by the flow rate control part into a reference gas flow rate by the use of a predetermined CF value, a sample gas flow rate calculation part that calculates the sample gas flow rate based on the reference gas flow rate obtained by the reference gas flow rate conversion part and the CF value corresponding to the reference gas flow rate, and a CF value update part that updates the CF value used by the reference gas flow rate conversion part or the sample gas flow rate calculation part in a case where a difference between the sample gas flow rate obtained by the sample gas flow rate calculation part and the target flow rate is bigger than a predetermined range. The flow rate value of the reference gas may be a ratio (%) of the reference gas flow rate in a case that the flow rate (for example, ccm unit) of the reference gas or a full scale is set as 100%.

In accordance with this invention, since the CF value of the sample gas corresponding to the flow rate value of the reference gas is stored in the relation data store part and the CF value is selected based on the flow rate value of the reference gas, it is possible to control the flow rate of the sample gas output by the mass flow controller with high accuracy. In addition, at this time, since the flow rate set value in order to output the target flow rate differs for each mass flow controller and the flow rate set value to output the target flow rate is not determined uniformly, there is a problem that it is not possible to also select the CF value whose variable is the flow rate set value. However, like this invention with a method of comparing the target flow rate with the flow rate (the flow rate of the sample gas) that is deemed to be actually output and updating the CF value so as to make the difference between the target flow rate and the flow rate that is deemed to be actually output within a predetermined range, it is possible to solve the above-mentioned problem and to select the CF value optimum for each flow rate value of the reference gas so that the flow rate can be controlled with high accuracy.

As a concrete embodiment of the above-mentioned CF value update part, it is conceivable that the CF value update part updates the reference gas flow rate by the use of a value that relates to the difference between the sample gas flow rate obtained by the sample gas flow rate calculation part and the target flow rate, and updates the CF value used by the reference gas flow rate conversion part by the use of the CF value corresponding to the updated reference gas flow rate. In accordance with this arrangement, since the difference between the sample gas flow rate obtained by the sample gas flow rate calculation part and the target flow rate is feedback controlled to the reference gas flow rate and the CF value is updated by reflecting the difference, it is possible to easily select the optimum CF value.

In addition, it is conceivable that the CF value update part sets a flow rate that is obtained by subtracting a difference between the sample gas flow rate obtained by the sample gas flow rate calculation part and the target flow rate from the target flow rate as a new target flow rate, outputs the new target flow rate to the reference gas flow rate conversion part, and updates the CF value used by the reference gas flow rate conversion part.

Furthermore, a program for a mass flow controller system in accordance with this invention is a program for controlling the mass flow controller system comprising a flow rate control device calibrated by a reference gas and a control device that outputs a flow rate set value to the flow rate control device, and is characterized by making the control device produce functions as a relation data store part that stores relation data indicating a corresponding relation between a flow rate value of the reference gas and a CF value of a sample gas, a reference gas flow rate conversion part that converts a target flow rate of the sample gas to be flowed by the flow rate control part into a reference gas flow rate by the use of a predetermined CF value, a sample gas flow rate calculation part that calculates the sample gas flow rate based on the reference gas flow rate obtained by the reference gas flow rate conversion part and the CF value corresponding to the reference gas flow rate, and a CF value update part that updates the CF value used by the reference gas flow rate conversion part or the sample gas flow rate calculation part in a case where a difference between the sample gas flow rate obtained by the sample gas flow rate calculation part and the target flow rate is bigger than a predetermined range.

Effect of the Invention

In accordance with the invention having the above-mentioned arrangement, it is possible to control the flow rate output by the mass flow controller with high accuracy by selecting the CF value optimum for each reference gas flow rate while focusing attention on the fact that the CF value of the sample gas varies for the reference gas flow rate.

EXPLANATION OF REFERENCE CHARACTERS

Figure 1:
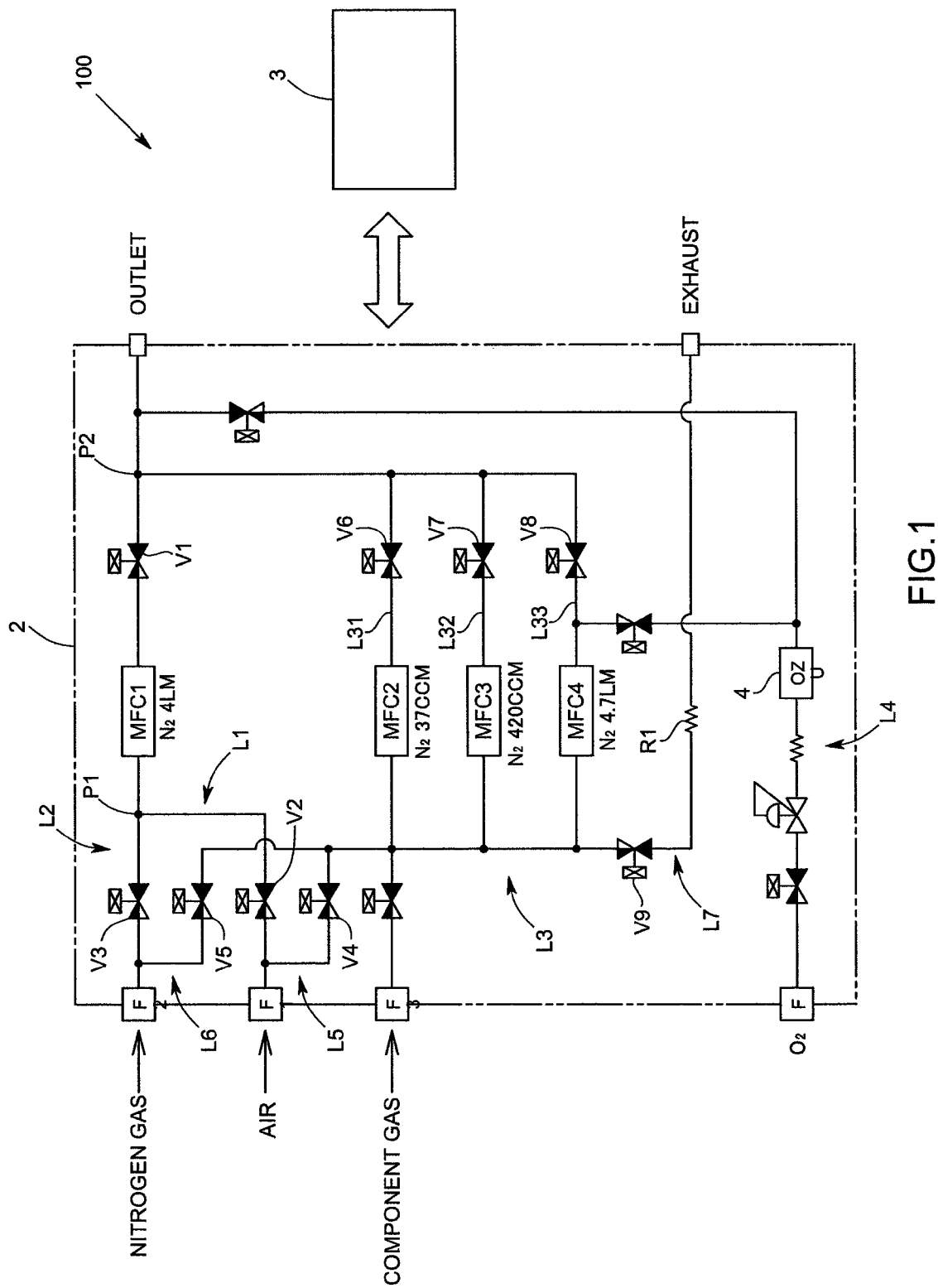
FIG. 1 is a configuration diagram of a mass flow controller system in accordance with one embodiment of this invention.

100 . . . mass flow controller system
2 . . . gas concentration regulator
MFC . . . mass flow controller
3 . . . control device
D1 . . . relation data store part
31 . . . receive part
32 . . . reference gas flow rate conversion part
33 . . . flow rate set value calculation part
34 . . . sample gas flow rate calculation part
35 . . . CF value update part

BEST MODES OF EMBODYING THE INVENTION

One embodiment of a mass flow controller system in accordance with this invention will be explained with reference to the drawings.

The mass flow controller system 100 in accordance with this embodiment is used for supplying a process gas to a semiconductor manufacture device by being combined with the semiconductor manufacture device, or for supplying a measurement gas or a sample gas such as a span gas to an analysis device such as an engine exhaust gas measurement device.

Concretely, the mass flow controller system 100 is to supply a reference gas for calibration with a predetermined concentration to the analysis device such as the engine exhaust gas measurement device, and a component gas (the span gas) whose concentration is known and a dilution gas for diluting the component gas at a predetermined concentration are input and a reference gas for calibration having a predetermined concentration is output. The configuration comprises, as shown in FIG. 1, a gas concentration regulator (a gas mixer) 2 and a control device 3 that controls the gas concentration regulator 2.

The gas concentration regulator 2 comprises an air supply line L1 that flows an air as being the dilution gas, a nitrogen gas supply line L2 that flows a nitrogen ($N_2$) gas as being the dilution gas and a component gas supply line L3 that flows the component gas. The gas concentration regulator 2 in this embodiment comprises a check line L4 where an ozone generator 4 for checking a conversion efficiency of an $NO_x$ convertor for nitrogen oxide analyzer is arranged.

Filters F1, F2 for removing foreign materials are arranged on a gas inlet of the air supply line L1 and a gas inlet of the nitrogen gas supply line L2, and the air supply line L1 and the nitrogen gas supply line L2 converge on a converging point P1 in a mid course. A mass flow controller (hereinafter referred to as MFC1) for controlling the flow rate of the dilution gas and an open/close valve V1 are arranged in this order on the downstream side of the converging point P1. In addition, an open/close valve V2 is arranged on the upstream side of the converging point P1 in the air supply line L1 and an open/close valve V3 is arranged on the upstream side of the converging point P1 in the nitrogen gas supply line L2. A flow channel L5 to be connected to the component gas line L3 is connected to the upstream side of the open/close valve V2 in the air supply line L1, and an open/close valve V4 is arranged in the flow channel L5. In addition, a flow channel L6 to be connected to the component gas line L3 is connected to the upstream side of the open/close valve V3 in the nitrogen gas supply line L2 and an open/close valve V5 is arranged in the flow channel L6.

A filter F3 for removing foreign materials is arranged on a gas inlet of the component gas supply line L3 and the component gas supply line L3 furcates into three furcated flow channels L31, L32, and L33 on the downstream side, and mass flow controllers (hereinafter called as MFC2, MFC3, MFC4) for controlling the component gas flow rate and open/close valves V6, V7, and V8 are arranged in this order in the furcated flow channels L31, L32, L33. The furcated flow channels L31, L32, L33 converge on the downstream side of the open/close valves V6, V7, V8 and the component gas supply line L3 converges into the air supply line L1 (the nitrogen gas supply line L2) on the converging point P2. The mass flow controllers MFC2, MFC3, MFC4 arranged on each furcated flow channel L31, L32, L33 are calibrated by the $N_2$ gas (the reference gas), and the flow rate varies for each of the mass flow controllers MFC2, MFC3, MFC4 and, for example, the flow rate range of the MFC2 is 37 ccm ($N_2$ reference (the flow rate range calibrated by flowing $N_2$ gas)), the flow rate range of the MFC3 is 420 ccm ($N_2$ reference), and the flow rate range of the MFC4 is 4700 ccm ($N_2$ reference).

The reference characters L7 in FIG. 1 designate a component gas exhaust line. The component gas exhaust line L7 exhausts a part of the component gas in order to prevent accumulation of the gas generating on the upstream of the MFC2 resulting from the smallness of the flow rate range of the MFC2 in a case that the component gas flows in the MFC2. Concretely, an upstream side of the component gas exhaust line L7 is connected to the upstream side of the MFC2 in the component gas line L3 and a downstream side of the component gas exhaust line L7 is connected to the outside. In addition, an open/close valve V9 that is open in case of using the MFC2 and a flow rate resister R1 to adjust the component gas flow rate flowing in the component gas exhaust line L7 are arranged in the component gas exhaust line L7.

In addition, each of the above-mentioned mass flow controllers MFC1, MFC2, MFC3, MFC4 respectively comprises a flow rate sensor that detects the flow rate of the sample gas flowing in the flow channel and a control part that conducts an operation of comparing an output value of the flow rate sensor with a flow rate set value transmitted from the control device 3, to be described later, and that controls a control valve arranged in the gas flow channel based on the calculation result. These mass flow controllers MFC1, MFC2, MFC3, MFC4 control the flow rate by the use of the flow rate set value converted into the nitrogen gas flow rate. The flow rate sensor may also use a thermal flow rate sensor or a differential pressure type flow rate sensor.

The control device 3 is communicable with the gas concentration regulator 2 having the above-mentioned mass flow controllers MFC1, MFC2, MFC3, MFC4 and outputs the flow rate set value to each of the mass flow controllers MFC1, MFC2, MFC3, MFC4.

Figure 2:
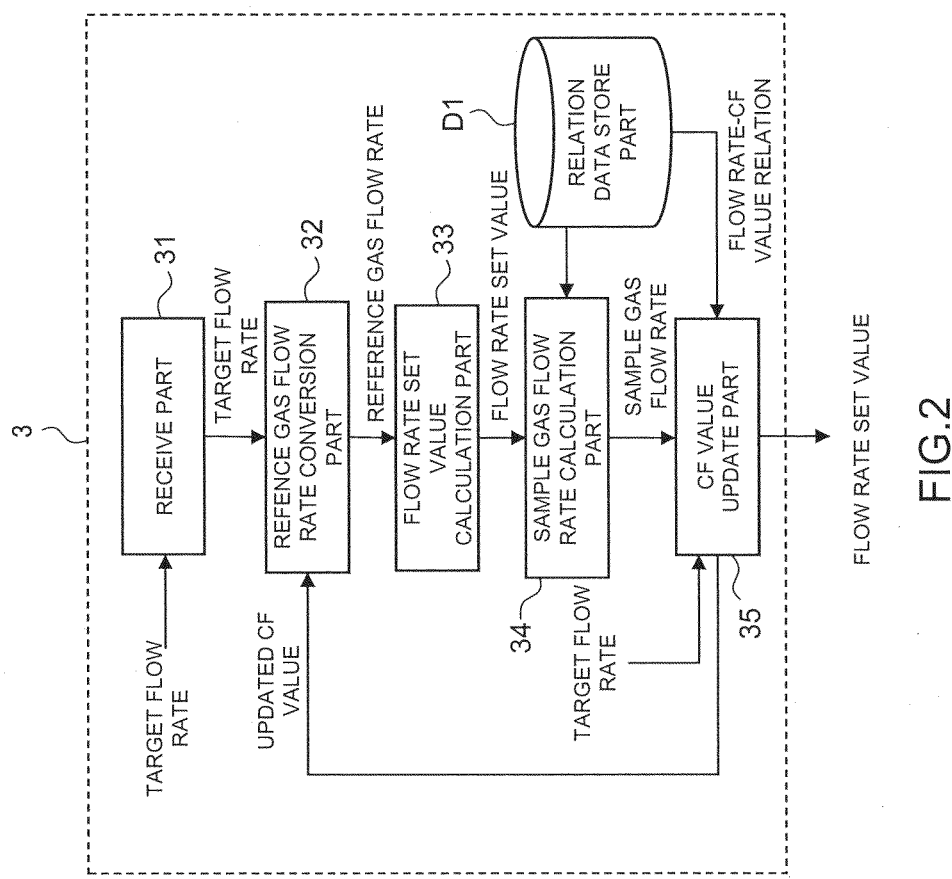
FIG. 2 is a function configuration diagram of a control device of the embodiment of FIG. 1.

The control device 3 comprises a digital or analog electric circuit having a CPU, an internal memory, an A/D convertor and a D/A convertor, a communication interface to communicate with the flow rate control valve, and an input interface. In order to control especially the mass flow controllers MFC2, MFC3, MFC4, the control device 3 produces functions at least as a relation data store part D1, a receive part 31, a reference gas flow rate conversion part 32, a flow rate set value calculation part 33, a sample gas flow rate calculation part 34 and a CF value update part 35 as shown in FIG. 2. In a case where the mass flow controllers MFC2, the MFC3 and the MFC4 are not distinguished, the mass flow controller MFC2, MFC3, MFC4 is just called as the MFC.

Each part D1, 31~35 will now be explained.

Figure 3:
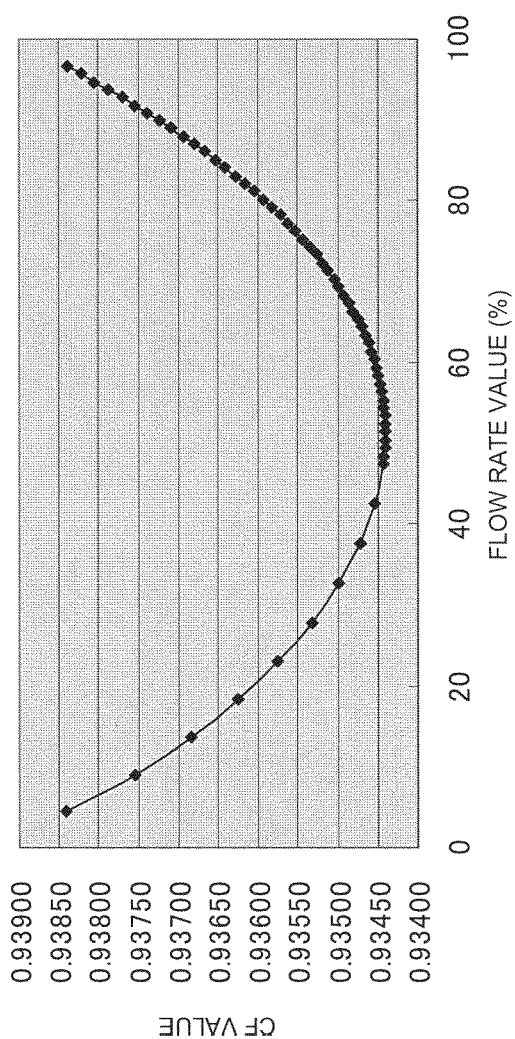
FIG. 3 is a graph showing a relationship between a flow rate of $CO_2$ gas with 20% concentration and a CF value in a case of using a mass flow controller 4.

The relation data store part D1 stores a relation data that indicates a corresponding relation (hereinafter called the flow rate—CF value relation) between each flow rate value of the reference gas (a ratio to the full scale (%), in this embodiment) and the CF value of the sample gas. The flow rate—CF value relation is obtained for each gas type having each concentration. FIG. 3 shows the CF value of carbon dioxide in a case where a carbon dioxide ($CO_2$) gas of 20% concentration flows at each flow rate value by the use of the MFC4. The relation data is stored in the relation data store part D1 in advance by a user.

Next, the CF value will be explained. The MFC is calibrated by connecting the MFC to be calibrated with the MFC (reference MFC) of high accuracy as a reference in a serial arrangement, by flowing the reference gas ($N_2$ gas) in the MFC and the reference MFC, and by making an analytical curve indicating the corresponding relation between the output value (for example, a voltage value) obtained by the flow rate sensor of the MFC to be calibrated and the flow rate value of the reference MFC. As mentioned, since the MFC is calibrated by the use of the reference gas, the flow rate obtained by the MFC becomes the flow rate of the reference gas. A coefficient that converts the flow rate of the reference gas into the sample gas flow rate is the CF value. For the MFC having the same specification (the specification such as a bypass, a sensor, a shape of a block is identical, namely a structure is almost the same with little difference due to a mechanical error), if the flow rate and the concentration of the sample gas is the same, the CF value becomes the same.

The receive part 31 receives a target signal to specify the target flow rate ($Q_m$) of the component gas to be flowed by the MFC. Concretely, the receive part 31 receives a target flow rate signal indicating the target flow rate ($Q_m$) calculated from the division ratio (the component gas concentration). Then, the target flow rate signal is output to the reference gas flow rate calculation part 32 and the CF value update part 35.

The reference gas flow rate calculation part 32 converts the target flow rate ($Q_m$) indicated by the target flow rate signal obtained from the receive part 31 into the reference gas flow rate ($Q_m f_{ref\,gas}$) by the use of the predetermined CF value or the CF value obtained by the CF value update part 35, to be described later. Concretely, the reference gas flow rate calculation part 32 converts the target flow rate ($Q_m$) into the flow rate ($Q_{ref\,gas}$) of the nitrogen gas (the CF value=1) being used as the reference gas with a procedure of dividing the target flow rate ($Q_m$) by the CF value. The predetermined CF value (the initial CF value) is determined by a rough flow rate of the reference gas, and for example, determined by the use of a one point correction coefficient ($\alpha$) determined by a ratio between a theoretical value, obtained by multiplying the flow rate sensor output ($Q_{100}\%$) in a full scale (100%) of the analytical curve made by the reference gas calibration by the CF value corresponding to the flow rate sensor output ($Q_{100}\%$), and an actual flow rate measurement value, which is the flow rate of the actually flowing sample gas in a case where the flow rate sensor output of the relevant MFC becomes the above-mentioned flow rate sensor output ($Q_{100}\%$) when the sample gas flows in the MFC. Concretely, a method for determining the CF value by the use of the one point correction coefficient ($\alpha$) sets the value ($Q_m/\alpha$) that is the target flow rate ($Q_m$) of the sample gas divided by the one point correction coefficient ($\alpha$) as the set value of the reference gas flow rate. Then, the corresponding CF value is set as the predetermined CF value based on the flow rate—the CF value relation.

The flow rate set value calculation part 33 calculates the flow rate set value of the MFC in order to flow the reference gas flow rate ($Q_{ref\,gas}$) converted by the reference gas flow rate conversion part 32. Concretely, the flow rate set value calculation part 33 calculates the flow rate set value ($S_x$) from an expression: the reference gas flow rate ($Q_{ref\,gas}$)/the full scale flow rate.

The sample gas flow rate calculation part 34 obtains the CF value ($CF(S_x)$) corresponding to the flow rate set value ($S_x$) obtained by the flow rate set value calculation part 33 based on the flow rate—the CF value relation and calculates the sample gas flow rate ($Q_{sam\,gas}$) based on the flow rate set value ($S_x$) and the CF value ($CF(S_x)$). The sample gas flow rate ($Q_{sam\,gas}$)=the flow rate set value ($S_x$)*the full scale flow rate*the CF value ($CF(S_x)$).

In a case where a difference between the sample gas flow rate ($Q_{sam\ gas}$) and the target flow rate ($Q_m$) obtained by the sample gas flow rate calculation part 34 is bigger than a predetermined range (for example, within ±0.01), the CF value update part 35 updates the CF value used by the reference gas flow rate conversion part 32 by the use of the relationship between the flow rate—the CF value based on a ratio ($Q_{sam\ gas}/Q_m$) between the sample gas flow rate ($Q_{sam\ gas}$) and the target flow rate ($Q_m$).

More specifically, if the flow rate set value prior to update is set to be $S_{before}$, and the flow rate set value after update is set to be $S_{after}$, the CF value update part 35 calculates the flow rate set value after update ($S_{after}$) based on an expression: $S_{after} = S_{before} * (Q_m/Q_{sam\ gas})$. Then, the CF value update part 35 calculates the CF value corresponding to the flow rate set value after update ($S_{after}$) based on the flow rate—the CF value relation indicated by the flow rate set value after update ($S_{after}$) and the relation data obtained from the relation data store part D1, outputs the data indicating the CF value to the reference gas flow rate conversion part 32, and updates the CF value used by the reference gas flow rate conversion part 32.

Figure 4:
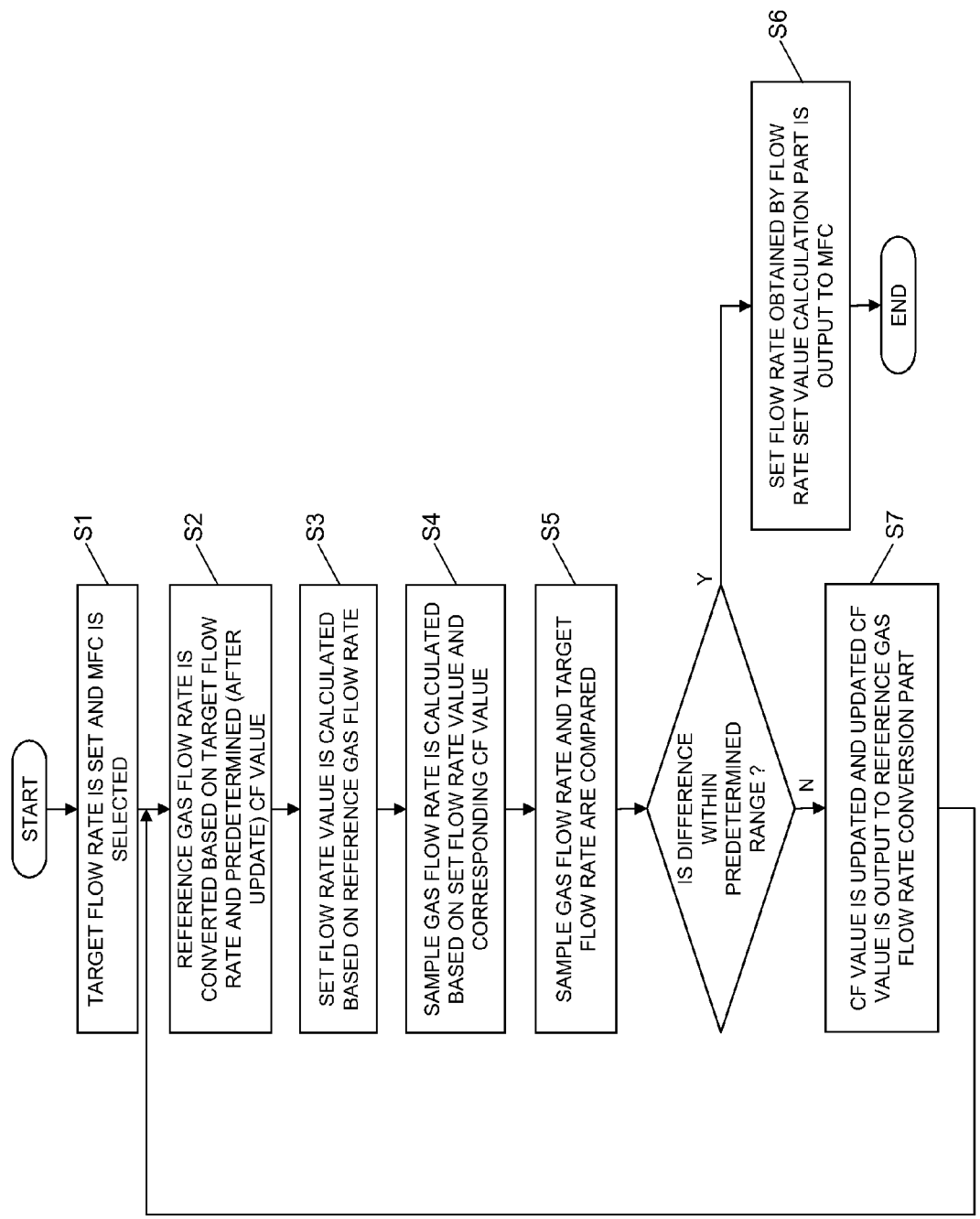
FIG. 4 is a flow chart showing an operation of the mass flow controller of the embodiment of FIG. 1.

Next, an operation of the mass flow controller system 100 having the above-mentioned arrangement will be explained with reference to FIG. 4.

First, the control device 3 receives a signal indicating a division ratio (%) from a gas analyzer (not shown in drawings) to which a gas concentration regulator 2 is connected. Then the target flow rate ($Q_m$) of the component gas to flow and the target flow rate of the dilution gas are set based on the division ratio, and the MFC is selected based on the flow rate of the component gas (step S1).

Next, the receive part 31 receives the target flow rate signal indicating the target flow rate ($Q_m$) of the component gas to flow, and outputs the received target flow rate signal to the reference gas flow rate conversion part 32. The reference gas flow rate conversion part 32 converts the target flow rate ($Q_m$) into the reference gas flow rate ($Q_{ref\ gas}$) by the use of the predetermined CF value (the initial CF value), and outputs the reference gas flow rate data to the flow rate set value calculation part 33 (step S2).

The flow rate set value calculation part 33 that receives the reference gas flow rate data calculates the flow rate set value ($S_x$) of the MFC to flow the reference gas flow rate ($Q_{ref\ gas}$) (step S3). Then, the flow rate set value calculation part 33 outputs the flow rate set value data to the sample gas flow rate calculation part 34.

The sample gas flow rate calculation part 34 that receives the flow rate set value data calculates the sample gas flow rate ($Q_{sam\ gas}$) based on the flow rate set value ($S_x$) and the CF value corresponding to the flow rate set value ($S_x$) (step S4).

Next, the CF value update part 35 compares the sample gas flow rate ($Q_{sam\ gas}$) with the target flow rate ($Q_m$) (step S5). Then, the CF value update part 35 outputs the flow rate set value obtained from the flow rate set value calculation part 33 to the MFC in a case where the difference ($Q_m - Q_{sam\ gas}$) between the sample gas flow rate ($Q_{sam\ gas}$) and the target flow rate ($Q_m$) falls in a predetermined range (for example, within ±0.01%) (step S6).

Meanwhile, in a case where the difference falls outside of the predetermined range, the CF value update part 35 updates the CF value and outputs the updated CF value to the reference gas flow rate conversion part 32 (step S7). With this procedure, the CF value that is used by the reference gas flow rate conversion part 32 is updated, and the same steps are repeated after step S2.

Effect of this Embodiment

In accordance with the mass flow controller system 100 of the present embodiment having the above-mentioned arrangement, it is possible to control the flow rate with a high level of accuracy by comparing the target flow rate ($Q_m$) with the flow deemed to be actually output (the sample gas flow rate ($Q_{sam\ gas}$)), updating the CF value so as to be the difference ($Q_m - Q_{sam\ gas}$) within the predetermined range and selecting the CF value that is optimum for each flow rate value of the reference gas.

Other Modified Embodiment

The present claimed invention is not limited to the above-mentioned embodiment.

For example, a modified embodiment of the CF value update part 35 may set a flow rate ($Q_m - (Q_m - Q_{sam\ gas})$) that is obtained by subtracting a difference ($Q_m - Q_{sam\ gas}$) between the sample gas flow rate ($Q_{sam\ gas}$) and the target flow rate ($Q_m$) from the target flow rate ($Q_m$) to compute a new target flow rate ($Q_m'$), output the new target flow rate ($Q_m'$) to the reference gas flow rate conversion part 32, and update the predetermined CF value used by the reference gas flow rate conversion part 32. At this time, it can be conceived that a method for updating the CF value is to update the CF value directly by a trial-and-error method so as to zero the difference between the new target flow rate ($Q_m'$) and the sample gas flow rate ($Q_{sam\ gas}$) obtained by the sample gas flow rate calculation part 34.

In addition, the CF value update part in the above-mentioned embodiment may not update the CF value used by the reference gas flow rate calculation part and may update the CF value used by the sample gas flow rate calculation part. At this time, it can be conceived that the CF value update part updates the reference gas flow rate in a manner similar to the above-mentioned embodiment by a ratio between the target flow rate and the sample gas flow rate obtained by the sample gas flow rate calculation part, and updates the CF value used by the sample gas flow rate calculation part by the use of the CF value corresponding to the updated reference gas flow rate. Then, after the CF value is updated, the sample gas calculation part newly calculates the sample gas flow rate based on the updated CF value and the reference gas flow rate, and the CF value update part compares the target flow rate with the new sample gas flow rate again. Next, the CF value update part outputs the flow rate set value to the MFC in a case where the difference between the sample gas flow rate and the target flow rate falls with a predetermined range. Meanwhile, in a case where the difference is out of the predetermined range, the CF value is repeatedly updated as in the above-mentioned embodiment until the difference between the sample gas flow rate and the target flow rate falls within the predetermined range. In addition, the CF value may be indirectly updated by updating the CF value after the reference gas flow rate is updated, or may be directly updated by a trial-and-error method.

Figure 5:
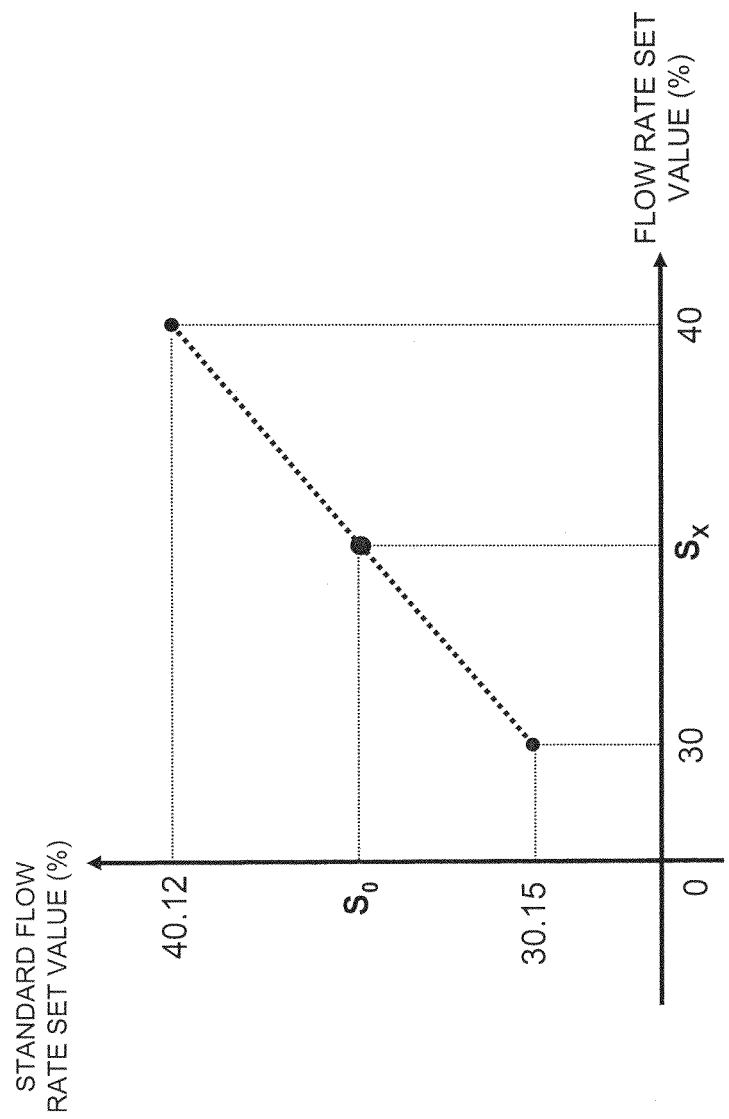
FIG. 5 is a diagram showing a relationship between a reference flow rate set value and the flow rate set value in accordance with a modified embodiment.

In addition, the flow rate set value calculation part 33 may set the flow rate set value of the MFC in order to flow the reference gas flow rate ($Q_{ref\ gas}$) with the following method. If the MFC is incorporated into the gas mixer, an error generates newly even though the MFC is calibrated independently. Accordingly, as shown in FIG. 5, the MFC incorporated into the gas mixer may again be calibrated by the use of the reference MFC and the flow rate set value of the MFC corresponding to a standard flow rate set value ($S_O$) in order to flow the reference gas flow rate ($Q_{ref\ gas}$) may be calculated as $S_x$. For a configuration after the gas mixer is incorporated, the flow rate set value of the MFC is calculated by making an initial analytical curve made by calibrating the MFC with the reference MFC independently, and a secondary analytical curve indicating the relation corresponding to the flow rate value of the reference MFC.

Furthermore, in addition to a case where the sample gas flow rate ($Q_{sam\,gas}$) is calculated based on the CF value (CF ($S_x$)) corresponding to the flow rate set value ($S_x$) obtained by the flow rate set value calculation part 33, the sample gas flow rate calculation part 34 may obtain the standard flow rate set value ($S_{01}$) corresponding to the flow rate set value ($S_x$) obtained by the flow rate set value calculation part 33 and calculate the sample gas flow rate ($Q_{sam\,gas}$) based on the standard flow rate set value ($S_{01}$) and the CF value (CF($S_{01}$)) corresponding to the standard flow rate set value ($S_{01}$).

Figure 6:
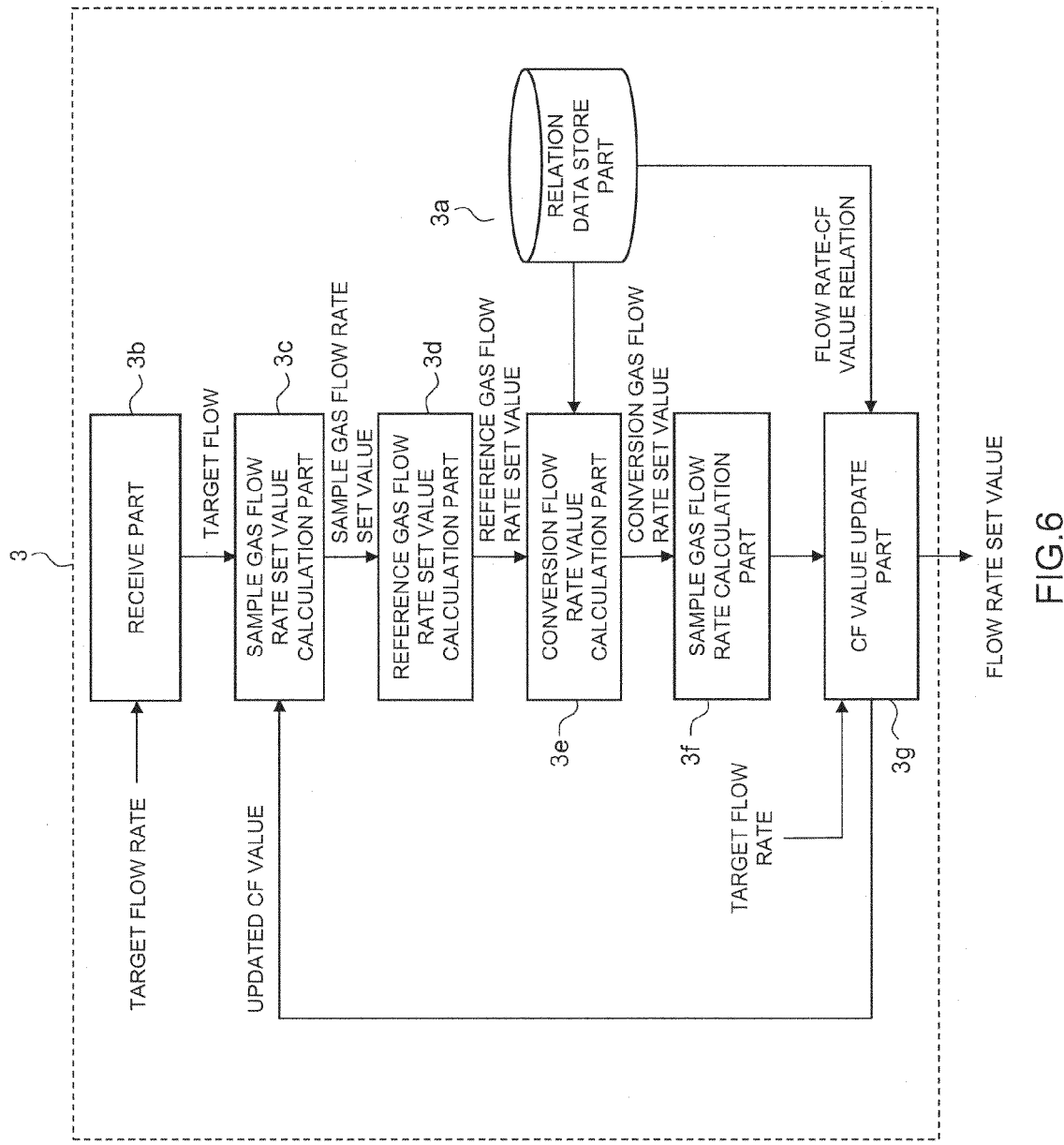
FIG. 6 is a function configuration diagram of a control device in accordance with the modified embodiment.

In addition, a configuration of the control device may comprise, as shown in FIG. 6, a relation data store part 3*a*, a receive part 3*b*, a sample gas flow rate set value calculation part 3*c*, a reference gas flow rate set value calculation part 3*d*, a conversion flow rate set value calculation part 3*e*, a sample gas flow rate calculation part 3*f* and a CF value update part 3*g*. The relation data store part 3*a* and the receive part 3*b* are the same as the relation data store part D1 and the receive part 31 in the above-mentioned embodiment.

The sample gas set value calculation part 3*c* calculates a sample gas flow rate set value ($S_a = Q_m / Q_{full}$) based on the target flow rate ($Q_m$) of the sample gas to be flowed by the MFC and its full scale flow rate ($Q_m$). Then the reference gas flow rate set value calculation part 3*d* receives the sample gas flow rate set value data and calculates the standard flow rate set value ($S_0 = S_a$/initial CF value) converted into the reference gas based on the sample gas flow rate set value ($S_a$) and a predetermined CF value (the initial CF value). In addition, the conversion flow rate set value calculation part 3*e* receives the reference gas flow rate set value data from the reference gas flow rate set value calculation part 3*d* and calculates a conversion flow rate set value ($S_b = S_0 * CF(S_0)$) converted into the sample gas based on the standard flow rate set value ($S_0$) and the CF value (CF ($S_0$)) corresponding to the standard flow rate set value ($S_0$) based on the relation data obtained from the relation data store part 3*a*. Later, the sample gas flow rate calculation part 3*f* calculates the sample gas flow rate ($Q_{sam\,gas}$) based on the conversion flow rate set value ($S_b$) and the full scale flow rate ($Q_{full}$) and outputs its data to the CF value update part 3*g*. Then, the CF value update part 3*g* updates the CF value used by the reference gas flow rate set value calculation part 3*d* by the use of the corresponding relation in a case where a difference ($Q_m - Q_{sam\,gas}$) between the sample gas flow rate ($Q_{sam\,gas}$) obtained by the sample gas flow rate calculation part 3*f* and the target flow rate ($Q_m$) is bigger than a predetermined range. A mode for updating the CF value may be the same method as described in the above-mentioned embodiment.

In the above-mentioned embodiment, the flow rate set value calculation part is provided and the sample gas flow rate is calculated through the flow rate set value, however, the flow rate set value calculation part may not be provided. In this case, the sample gas flow rate calculation part calculates the sample gas flow rate based on the reference gas flow rate obtained by the reference gas flow rate conversion part and the CF value corresponding to the reference gas flow rate.

Furthermore, in the above-mentioned embodiment, the mass flow controller system is applied to the gas concentration regulator (the gas mixer), however, it may be applied also to a flow rate control device using a MFC, for example, a gas supply device to be connected to a semiconductor manufacturing device.

In addition, in the above-mentioned embodiment, the mass flow controller system has an arrangement wherein the mass flow controller as being the flow rate control device is arranged separately from the control device, however, the control device may be integrally formed with the mass flow controller as being the flow rate control device. In this case, a control part inside of the mass flow controller may produce a function as the control device. However, since a CPU incorporated in the mass flow controller is inferior in performance, it is preferable to be controlled by a control device separately arranged from the mass flow controller.

The present claimed invention is not limited to the above-mentioned embodiment, and it is a matter of course that the present claimed invention is variously modified without departing from a spirit of the invention.

POSSIBLE APPLICATIONS IN INDUSTRY

As mentioned, in accordance with the presently claimed invention, it is possible to control a flow rate output by the mass flow controller with high accuracy.

The invention claimed is:

1. A mass flow controller system, comprising:
   a flow rate control device, calibrated by a use of a reference gas, which controls at least one valve based on a flow rate set value; and
   a control device that outputs the flow rate set value to the flow rate control device, including memory and an associated processor,
   wherein the memory stores a relation data that indicates a corresponding relation between a flow rate value of the reference gas and a conversion factor (CF) value of a sample gas, and
   wherein the processor is configured to execute a control program including:
      a reference gas flow rate conversion part that converts a target flow rate of the sample gas to be flowed by the flow rate control device into a reference gas flow rate by the use of a predetermined CF value,
      a sample gas flow rate calculation part that calculates the sample gas flow rate based on the reference gas flow rate obtained by the reference gas flow rate conversion part and a corresponding CF value for converting the reference gas flow rate into the sample gas flow rate, and
      a CF value update part that updates the CF value used by the reference gas flow rate conversion part or the sample gas flow rate calculation part in a case where a difference between the sample gas flow rate obtained by the sample gas flow rate calculation part and the target flow rate is bigger than a predetermined range, and once the difference falls within the predetermined range, outputs the flow rate set value to the flow rate control device based on the reference as flow rate.

2. The mass flow controller system described in claim 1, wherein
   the CF value update part updates the reference gas flow rate by the use of a value that relates to the difference between the sample gas flow rate obtained by the sample gas flow rate calculation part and the target flow rate, and updates the CF value used by the reference gas flow rate conversion part by the use of the CF value corresponding to the updated reference gas flow rate.

3. The mass flow controller system described in claim 1, wherein
   the CF value update part sets a flow rate that is obtained by subtracting a difference between the sample gas flow rate obtained by the sample gas flow rate calculation part and the target flow rate from the target flow rate as a new target flow rate, outputs the new target flow rate to the reference gas flow rate conversion part and updates the CF value used by the reference gas flow rate conversion part.

4. A method of operating a mass flow controller system comprising a flow rate control device, which controls at least one valve based on a flow rate set value, calibrated by a reference gas and a control device including memory and an associated processor, that outputs the flow rate set value to the flow rate control device, the method comprising:

executing a control program with the processor of the control device, storing a relation data indicating a corresponding relation between a flow rate value of the reference gas and a conversion factor (CF) value of a sample gas in the memory, converting a target flow rate of the sample gas to be flowed by the flow rate control device into a reference gas flow rate by the use of a predetermined CF value, calculating the sample gas flow rate based on the reference gas flow rate and a corresponding CF value for converting the reference gas flow rate into the sample gas flow rate, and updating the predetermined CF value or the corresponding CF value in a case where a difference between the sample gas flow rate and the target flow rate is bigger than a predetermined range, and once the difference falls within the predetermined range, outputs the flow rate set value to the flow rate control device based on the reference as flow rate.

* * * * *

UNITED STATES PATENT AND TRADEMARK OFFICE
CERTIFICATE OF CORRECTION

PATENT NO. : 9,223,318 B2
APPLICATION NO. : 13/519115
DATED : December 29, 2015
INVENTOR(S) : Hiroyuki Takeuchi, Yutaka Yoneda and Yasuhiro Isobe Page 1 of 1

It is certified that error appears in the above-identified patent and that said Letters Patent is hereby corrected as shown below:

In the claims, column 10, line 49, delete "as" and insert --gas-- and;

column 11, line 30, delete "as" and insert --gas--.

Signed and Sealed this
Twenty-eighth Day of June, 2016

Michelle K. Lee
*Director of the United States Patent and Trademark Office*